(12) United States Patent
Erlanger

(10) Patent No.: US 8,027,909 B2
(45) Date of Patent: *Sep. 27, 2011

(54) EFFICIENT MARKET FOR FINANCIAL PRODUCTS

(75) Inventor: Michael David Erlanger, Westport, CT (US)

(73) Assignee: Marketcore.com, Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/765,688

(22) Filed: Apr. 22, 2010

(65) Prior Publication Data

US 2010/0205116 A1    Aug. 12, 2010

Related U.S. Application Data

(63) Continuation of application No. 09/370,619, filed on Aug. 7, 1999, now Pat. No. 7,742,966, which is a continuation-in-part of application No. 09/178,400, filed on Oct. 24, 1998, and a continuation-in-part of application No. 09/296,573, filed on Apr. 22, 1999, now Pat. No. 6,594,635.

(51) Int. Cl.
  *G06Q 40/00* (2006.01)
  *G06Q 30/00* (2006.01)
(52) U.S. Cl. .............. 705/37; 705/1; 705/4; 705/14.1; 705/14.25; 705/35; 705/38
(58) Field of Classification Search .............. 705/37, 705/38, 35, 4, 1, 14.1, 14.25
See application file for complete search history.

(56) References Cited

U.S. PATENT DOCUMENTS

| 5,537,315 | A |   | 7/1996  | Mitcham              |
|-----------|---|---|---------|----------------------|
| 5,732,400 | A |   | 3/1998  | Mandler et al.       |
| 5,940,812 | A | * | 8/1999  | Tengel et al. ......... 705/38 |
| 5,966,699 | A | * | 10/1999 | Zandi ................. 705/38 |
| 5,966,700 | A | * | 10/1999 | Gould et al. .......... 705/38 |
| 5,995,947 | A | * | 11/1999 | Fraser et al. .......... 705/38 |
| 6,272,528 | B1| * | 8/2001  | Cullen et al. ......... 705/36 R |

OTHER PUBLICATIONS

Lal, et al.; "Compensation Plans for Single- and Multi-Product Salesforces: An Application of the Holmstrom-Milgronn Model"; Management Science/ vol. 39, No. 7; Jul. 1993; pp. 777-793.

* cited by examiner

*Primary Examiner* — Mary Cheung
*Assistant Examiner* — Daniel L Greene
(74) *Attorney, Agent, or Firm* — St. Onge Steward Johnston & Reens LLC

(57) ABSTRACT

A data processing system is disclosed that provides an efficient market for: (1) the provision of loans and lines of credit between lenders and those seeking loans and lines of credit, and (2) the sale of loans between loan pool traders. One embodiment of the present invention comprises: receiving at a data processing system a lending criteria from each of a plurality of lenders; compiling a first set of statistics in the data processing system based on the lending criteria from each of the plurality of lenders; and outputting from the data processing system the first set of statistics to a first lender at a price that is based on a measure of fees incurred with respect to the first lender.

39 Claims, 4 Drawing Sheets

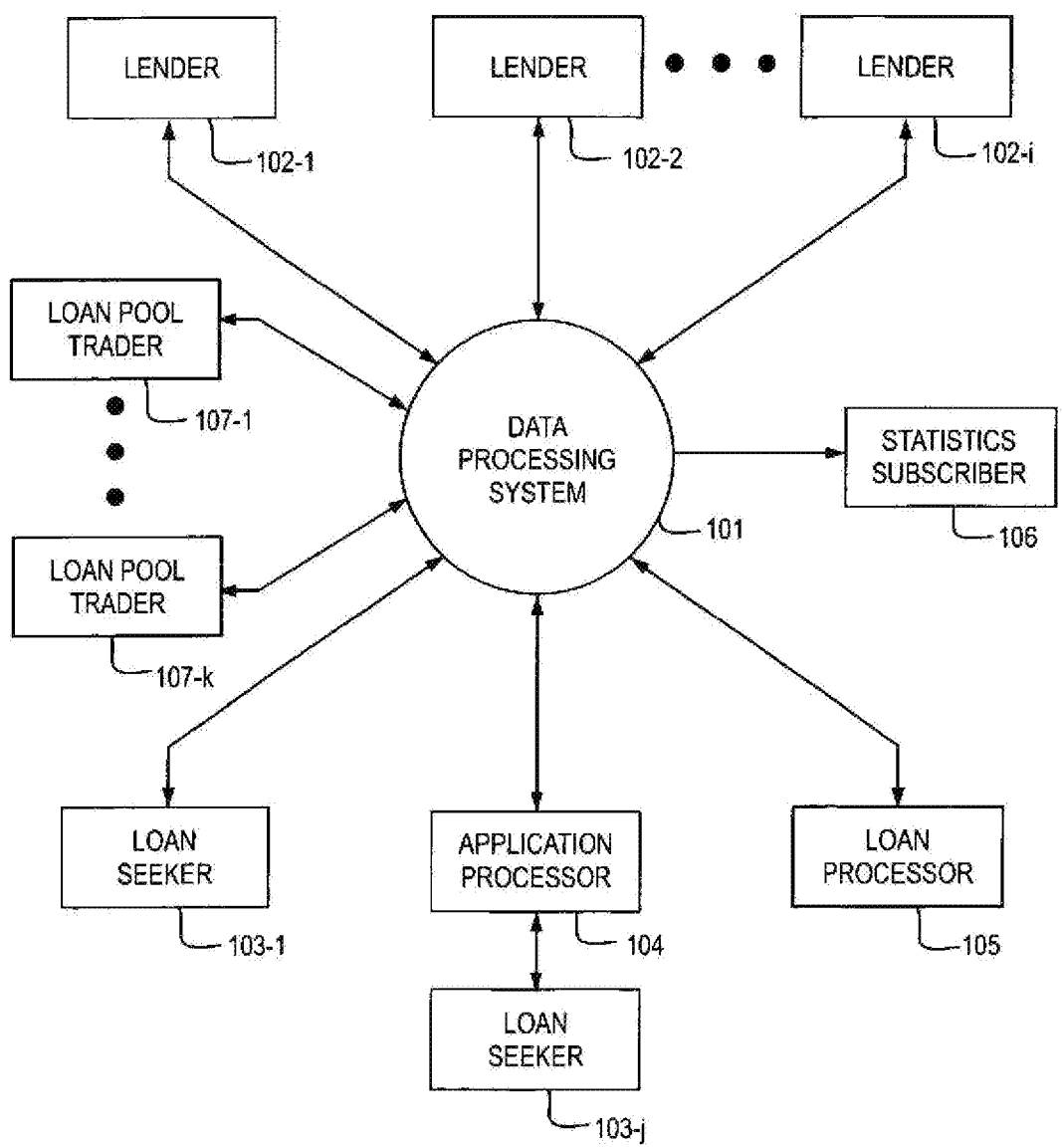

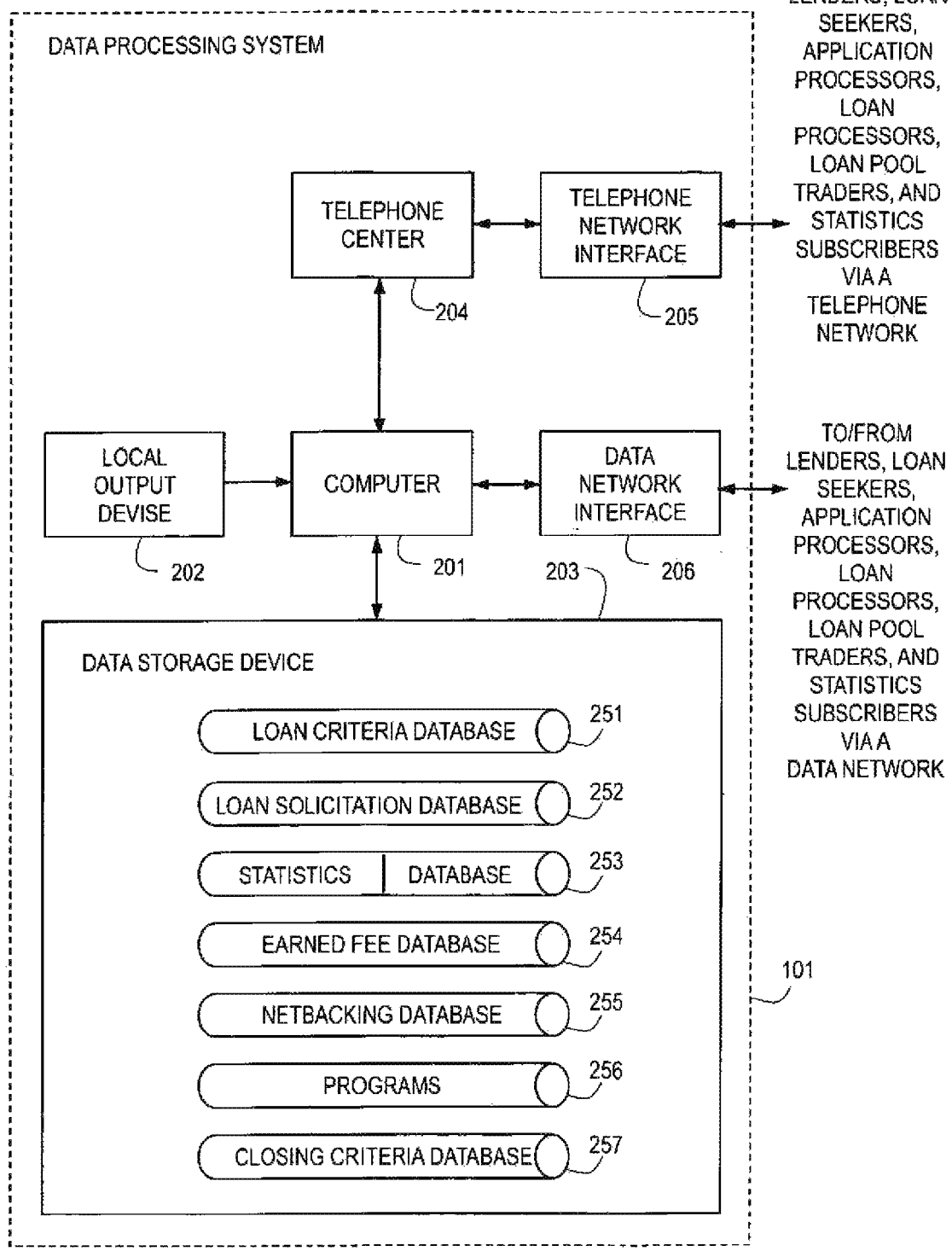

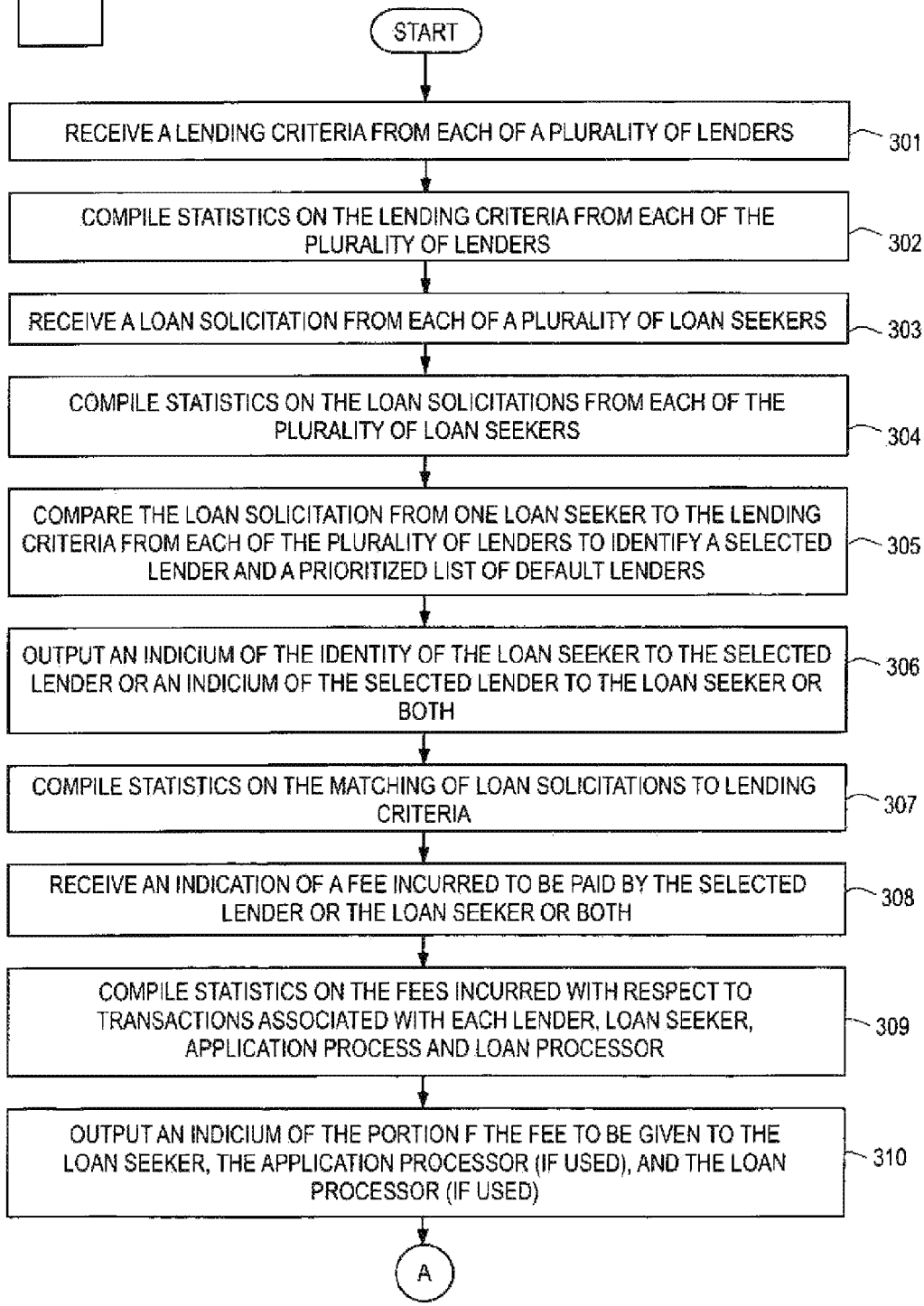

EFFICIENT MARKET FOR FINANCIAL PRODUCTS

CROSS-REFERENCE TO RELATED APPLICATIONS

This application is a continuation of and claims the benefit of:

(1) U.S. patent application Ser. No. 09/370,619, filed Aug. 7, 1999, now U.S Pat. No.7,742,966, entitled "A Data Processing System for Providing an Efficient Market for Loans and Lines of Credit," which is incorporated by reference; which was a continuation-in-part of, and claimed the benefit of:

(2) U.S. patent application Ser. No. 09/178,400, filed Oct. 24, 1998, entitled "A Data Processing System for Providing an Efficient Market for Loans and Lines of Credit," which is incorporated by reference, and (3) U.S. patent application Ser. No. 09/296,573, filed Apr. 22, 1999, now U.S. Pat. No. 6,594,635, entitled "A Data Processing System for Providing an Efficient Market for Insurance and Reinsurance," which is also incorporated by reference.

FIELD OF THE INVENTION

The present invention relates to electronic commerce in general, and, more particularly, to a data processing system that provides an efficient market for: (1) the provision of loans and lines of credit between lenders and those seeking loans and lines of credit (the "primary" or "retail" market), and (2) the trading of existing loans between loan pool traders (the "secondary" or "wholesale" market).

BACKGROUND OF THE INVENTION

As anyone who has ever sought a loan or a line of credit knows (hereinafter a "loan seeker"), it can be a challenge to find a lender who is willing to offer a loan or line of credit at a reasonable interest rate and on reasonable terms. Although the verity of this statement is clear for those with poor credit histories and little collateral, it is also true for those with excellent credit histories and substantial assets. For example, although many lenders might endeavor to provide some types of loans and lines of credit, few lenders provide more than a small subset of all of the types of loans and lines of credit offered by all of the lenders. One lender might offer only 30-year adjustable-rate home mortgage loans for under $300,000 while another only offers 15-year fixed-rate home mortgage loans for over $70,000. Therefore, even a creditworthy loan seeker might waste his or her time approaching lenders who do not offer the type of loan or line of credit he or she desires.

Furthermore, even if a creditworthy loan seeker finds a lender who does offer the type of loan or line of credit he or she desires, the loan seeker is unlikely to know if that lender is offering a competitive interest rate and competitive terms. In general, there are three ways that a loan seeker can remedy this.

First, the loan seeker can contact (e.g., in person, on the telephone, etc.) numerous lenders and inquire into their interest rates and terms for a particular type of loan. In fact, many people do precisely this when seeking a home mortgage loan because minor differences in interest rates and terms are well-known to result in substantial differences in monthly payments. Although it clearly pays to shop around, even the most stalwart are unlikely to contact more than a dozen lenders because of the time and effort involved.

Second, the loan seeker can consult newspapers and other periodicals that publish interest rates and terms for a variety of lenders. Such listing are, however, unlikely to be comprehensive and are likely to be out-of-date, particularly in times when interest rates are changing rapidly. One factor that accelerates the perishability of rates in newspapers and periodicals concerns lenders who discover that their published rates and terms are not competitive. Typically, those lenders immediately change their rates and terms, but because of the latency in publishing and disseminating newspapers and periodicals those changes are not immediately well-known. Although a loan seeker can consult published resources that do not have a printing latency (e.g., the Internet sites of lenders or mortgage brokers, etc.), those rates are often misleading because they apply only to the most creditworthy.

Third, the loan seeker can contact an "independent" loan broker who represents a plurality of lenders. The independent loan broker is not, however, obligated or motivated to provide the loan seeker with the least expensive loan or line of credit at the best terms, but rather the loan or line of credit that garners the loan broker the largest commission for the least cost. In other words, because the loan broker does not have a fiduciary duty to the loan seeker, and, therefore is not legally (or financially) motivated to find the loan seeker the least expensive loan or line of credit at the best terms, the loan seeker might be disadvantaged by using a loan broker rather than using a lender directly.

Regardless, when a loan seeker has satisfied himself or herself that he or she has found a lender who offers the desired type of loan or line of credit at a competitive interest rate and at reasonable terms, the loan seeker must thereafter expend an indeterminate amount of time and energy to learn if he or she qualifies for a loan or line of credit from that lender. And although a loan seeker might satisfy himself or herself that he or she has located a lender with the best interest rate and terms, that does not mean that he or she has, in fact, done so. There could be other lenders, unknown to the loan seeker, who offer better rates and terms.

Furthermore, the lender might decide that the loan seeker does not qualify for the desired loan or line of credit, or that the loan seeker, because of credit problems or little collateral, does not qualify for the best rates and terms, which are what brought the loan seeker to that lender in the first place. In either case, the loan seeker might have wasted his or her time in approaching the lender or might not receive the interest rate and terms that were anticipated.

The end result is that, in today's marketplace, it can be difficult for those seeking a loan or a line of credit to find a lender that is willing to offer the type of loan or line of credit that the loan seeker desires at a competitive interest rate and terms.

Perhaps surprisingly, it is even more difficult for each lender to find a satisfactory number of loan seekers who are interested in and qualify for the particular lender's loans and lines of credit. In fact, some lenders spend tens of millions of dollars per year on advertising to entice potential borrowers to their door only to learn that well more than half do not qualify for any type of loan or line of credit under the lender's lending criteria. This is extremely inefficient and problematic for lenders because the money spent on advertising, 800-numbers, application takers and reviewers must be recouped from the earnings of those financial products that are, in fact, provided to loan seekers who do qualify and ultimately close a loan or line of credit. In other words, a portion of the money (e.g., application fees, points, interest, etc.) paid by those loan seekers who do close loans and lines of credit goes to pay for the lender's costs in advertising and culling out the uncreditworthy. Therefore, a lender could offer creditworthy loan seekers lower fees and interest rates if the lender could forego advertising and had only creditworthy loan seekers knocking on its door.

In summary, not only do loan seekers have difficulty locating a lender that offers the type of loan or line of credit sought at competitive rates and terms, but it is also difficult for lenders to find large numbers of loan seekers who are interested in, and qualify for, the lender's offerings, without having to spend time and money on advertising and culling out the unqualified.

Therefore, the need exists for a mechanism that enables a loan seeker to quickly and easily find a lender that offers the type of loan or line of credit that he or she desires at the best possible interest rate and terms and that also provides lenders with large numbers of creditworthy loan seekers at a reasonable cost.

SUMMARY OF THE INVENTION

The present invention is a data processing system that provides an efficient market for: (1) the provision of loans and lines of credit from lenders to those seeking loans and lines of credit (the "primary" or "retail" market), and (2) the trading of existing loans between loan pool traders (in the "secondary" or "wholesale" market). In particular, the data processing system provides an efficient market that not only invites lenders, loan seekers, and loan pool traders to patronize the system, but that induces them to patronize it as well.

The inducement is manifested in several ways. They include, but are not limited to:

For loan seekers:
the data processing system provides a loan seeker with a single "one-stop-shopping" source that matches the loan seeker to a lender who offers the type of loan or line of credit sought;
the data processing system matches a loan seeker to only those lenders whose lending criteria are satisfied by the loan seeker's loan solicitation; and
the data processing system guarantees a loan seeker that he or she is being offered the best interest rate or the best terms or both available from those lenders who patronize the system (of those lenders who deem the loan seeker creditworthy and who offer the type of loan or line of credit sought).

For lenders:
the data processing system provides those lenders who offer competitive rates or terms or both with a large number of loan seekers who the lender deems creditworthy at a lower cost than in the prior art, which lowers the lender's cost of doing business that, in turn, enables the lender to offer even better rates and terms;
the data processing system provides those lenders who offer competitive rates or terms or both with statistics regarding the market in loans and lines of credit, which can be used by the lenders to: (1) determine which types of loans and lines of credit they should offer and at what interest rates and terms, (2) arbitrage those lenders who do not have access to the statistics, and (3) cost/value the loans in their portfolio, which facilitates the sale of those loans, which, in turn, increases the lenders' liquidity, reduces their risk, and lowers their cost of doing business, and (4) cost/value the loans of other lenders being offered for sale, which facilitates the purchase of those loans;
the data processing system provides those lenders who offer competitive rates or terms or both with an efficient market for the purchase and sale of the servicing of loans (e.g., providing payment collection and other administrative overhead, etc.); and
the data processing system provides every lender with the capability get a loan for its customers when the lender itself does not offer the type of loan sought (or does offer the type of loan sought but not at a competitive interest rate or terms) by enabling the lender to act as an application processor for its customers, and thereby earn a fee by acting as an application processor.

For loan pool traders:
the data processing system provides loan pool traders with an efficient market for buying and selling individual loans and pools of heterogeneous loans;
the data processing system provides loan pool traders with an efficient market for buying and selling individual loans and pools of loans at prices based on the closing criteria of the loans;
the data processing system provides loan pool traders with statistics regarding the market in pools of loans, which can be used by the loan pool traders to: (1) assess the value of an individual loan, (2) assess the value of a pool of loans, (3) determine which types of loans they desire to buy and sell, and (4); arbitrage those loan pool traders who do not have access to the statistics;
the data processing system provides loan pool traders with an efficient market for the purchase and sale of the servicing of pools of loans (e.g., providing payment collection and other administrative overhead, etc.).

These inducements are possible because the present invention recognizes that the costs of doing business for lenders and loan pool traders and the interest rates and fees to loan seekers are unnecessarily high because an efficient market for loans and lines of credit does not exist. Furthermore, the present invention recognizes that if a highly efficient market for loans and lines of credit did exist, the cost of doing business for lenders and loan pool traders could decrease, the interest rates and fees to loan seekers could decrease, and the provider of the market could also make a profit. Furthermore, the existence of an efficient market could even provide lenders with a larger profit than they make now if operating costs drop more quickly than interest rates drop. In other words, the intermediation of an efficient market between lenders, loan seekers and loan pool traders can actually make the cost of loans and lines of credit to loan seekers go down, the cost of doing business to lenders and loan pool traders go down and the profits to lenders and loan pool traders go up. Therefore, a data processing system in accordance with the illustrative embodiment endeavors to provide a market for the provision of loans and lines of credit that is highly efficient.

It is also recognized that the efficiency of the market for loans and lines of credit (the primary or retail market) is affected by the efficiency of the market in pools of loans (the secondary or wholesale market) and vice versa. Therefore, the illustrative embodiment of the present invention seeks to improve the efficiency of both the primary market and the secondary market so that, to the extent the efficiency in one enhances the efficiency in the other, a synergy of efficiency between the two markets is affected. For example, to affect this synergy, fees incurred by a patron to the owner/operator of the data processing system for lending through the primary market might be credited against the fees incurred by the patron to the owner/operator of the data processing system for trading through the secondary market (and vice versa).

The present invention also recognizes that merely providing a market and inviting lenders, loan seekers, and loan pool traders to patronize it is, in and of itself, insufficient to yield an efficient market. The prerequisite to an efficient market is volume-in numbers of lenders, loan seekers, loan pool traders, and dollars transacted—and the prerequisite to volume is an efficient market. This is the Catch-22 that has, until now, stemmed the development of an efficient market in loans and lines of credit.

To overcome this predicament, some data processing systems in accordance with the present invention incorporate one or more mechanisms that prime an efficient market and that reinforce the efficiency of the market. Three illustrative mechanisms are:

First, the pro rata fees incurred with respect to transactions associated with a patron for patronizing the system might decrease as the total fees incurred by transactions associated with that patron increase. For example, although the owner/operator of the data processing system might receive a fee from a lender when the lender closes a loan through the system, a portion of the fee might be remitted back to the lender for having closed a large volume of loans through the system in a given interval. Advantageously, the fees from all types of loans and lines of credit are aggregated for determining the amount of the remittance. Such a remittance schedule could be:

TABLE 1

Illustrative Remittance Schedule

| Total Fees Incurred With Respect To Transactions Associated With Patron In The Last Month | % of Total Fees Incurred To Be Remitted Back To Lender |
| --- | --- |
| $0 to $250,000 | 0% |
| $250,001 to $500,000 | 5% |
| $500,001 to $1,000,000 | 15% |
| $1,000,001 to $5,000,000 | 35% |
| $5,000,001 to $100,000,000 | 50% |

Therefore, this mechanism encourages lenders to patronize the system with larger, rather than smaller, volumes, which is accomplished by endeavoring to offer the most varieties of loans and lines of credit at the lowest interest rates and at the best possible terms.

Second, some or all of the parties who patronize the system might receive statistics compiled by the system on the condition of the market (ie., a service analogous to the Bloomberg News Service or a stock ticker, etc.) in loans and lines of credit. Although these statistics cost the owner/operator of the data processing system little to compile, their value is so great that lenders and loan pool traders who do not have access to the statistics will have difficulty, in the long run, in competing with those who do. An analogy makes the situation clear; a trader of stocks without access to the stock ticker and current bid and offer quotations can be arbitraged by a trader who does.

Furthermore, although some or all of the statistics might be sold for cash, the statistics are advantageously given for free, or sold at a subsidized price, to those patrons of the system who actually transact business through the system. Advantageously, price for the statistics decreases as the measure of fees incurred by transactions associated with a patron increases. For the purposes of this specification, the provision of statistics for free, or at a subsidized price, to those patrons of the system who close loans or trade loans or both through the system is called "netbacking."

An illustrative netbacking schedule could be:

TABLE 2

Illustrative Netbacking Schedule

| Total Fees Incurred With Respect To Transactions Associated With Patron In The Last Month | Cost of Statistics to Patron |
| --- | --- |
| $0 to $250,000 | $1,000,000 |
| $250,001 to $500,000 | $ 750,000 |
| $500,001 to $1,000,000 | $ 250,000 |
| $1,000,001 to $5,000,000 | $ 100,000 |
| >$5,000,000 | $0 (free) |

Netbacking also encourages lenders to patronize the system with larger, rather than smaller, volumes, which is accomplished by endeavoring to offer the most varieties of loans and lines of credit at the lowest interest rates and at the best possible terms.

Third, a portion of the fees incurred with respect to transactions associated with a lender for lending through the data processing system might be credited against the fees incurred with respect to transactions associated with the lender for trading loans through the system (as either a buyer or a seller or both). For example, many lenders desire to sell a loan immediately after they have made it.

It is, therefore, possible that a lender will lend to a loan seeker through the system, and incur a fee for doing so, and then sell that loan through the system and incur a second fee. The illustrative embodiment of the present invention credits, according to some credit schedule, a portion of the fees associated with a patron for lending through the system against the fees incurred for trading a loan through the system. Such a credit schedule could be:

TABLE 3

Illustrative Credit Schedule

| Total Fees Incurred With Respect To Transactions In Primary Market With Respect To Patron In The Last Month | % of Total Fees Incurred With Respect To Transactions In Primary Market To Be Credited Against Total Fees Incurred With Respect To Transactions In Secondary Market |
| --- | --- |
| $0 to $250,000 | 0% |
| $250,001 to $500,000 | 5% |
| $500,001 to $1,000,000 | 10% |
| $1,000,001 to $5,000,000 | 20% |
| >$5,000,000 | 35% |

An alternative embodiment of the present invention works in reverse and credits, according to some schedule, a portion of the fees incurred with respect to transactions associated with a patron who trades loans through the system against the fees incurred for lending through the system. In yet another embodiment of the present invention the fees incurred in trading loans through the system are credited against the fees for lending through the system and the fees incurred for lending through the system are credited against the fees for trading loans through the system.

Therefore, this mechanism also encourages lenders to patronize the system with larger, rather than smaller, volumes, which is accomplished by endeavoring to offer the most varieties of loans and lines of credit at the lowest interest rates and at the best possible terms, and by patronizing the secondary market in loans with the best possible bids and offers.

The end result is that in order to compete in the consumer finance market lenders and loan pool traders must have access to the statistics, which encourages them to patronize the system with competitive offerings to get access to the statistics, which increases the competitiveness of the market, increases its volume, and promotes its efficiency. Therefore, some embodiments of the present invention prime the market for efficiency and incorporate a positive feedback mechanism that maintains that efficiency. It is understood, however, that the priming of embodiments of the present invention might be assisted by advertising and other marketing techniques.

An embodiment of the present invention comprises: receiving at a data processing system a lending criteria from each of a plurality of lenders; compiling a first set of statistics in the data processing system based on the lending criteria from each of the plurality of lenders; and outputting from the data processing system the first set of statistics to a first lender at a price that is based on a measure of fees incurred with respect to the first lender.

BRIEF DESCRIPTION OF THE DRAWINGS

FIG. 1 depicts a schematic diagram of the illustrative embodiment of the present invention.

FIG. 2 depicts a block diagram of data processing system 101 depicted in FIG. 1.

FIG. 3 depicts the relationship of FIGS. 4 and 5.

FIG. 4 depicts a first portion of a flowchart of the operation of data processing system 101 in accordance with the illustrative embodiment.

DETAILED DESCRIPTION OF THE INVENTION

Figure 5:
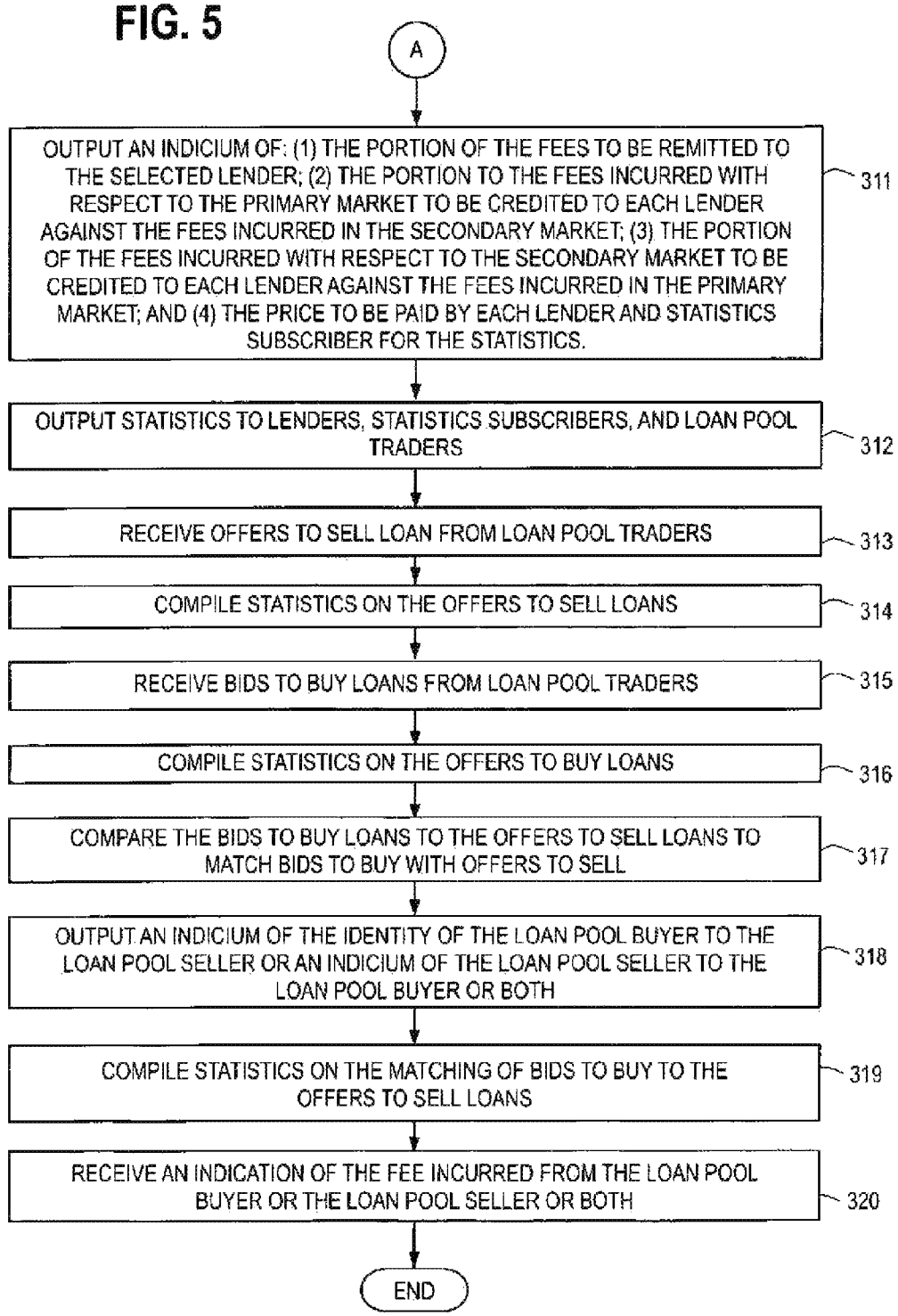
FIG. 5 depicts a second portion of a flowchart of the operation of data processing system 101 in accordance with the illustrative embodiment.

FIG. 1 depicts a schematic diagram of the illustrative embodiment of the present invention in which data processing system 101 provides a market for: (1) the provision of loans and lines of credit from a plurality of lenders (e.g., lenders 102-1 through 102-$i$) to a plurality of loan seekers (e.g., loan seekers 103-1 through 103-$j$), and (2) the trading of loans between loan pool traders (e.g., loan pool traders 107-1 through 107-$k$).

For the purposes of this specification, a "lender" is defined as an entity that provides, or endeavors to provide, a loan or line of credit to a loan seeker, and a "loan seeker" is defined as an entity that seeks a loan or line of credit. Furthermore, a "loan" is defined as something (e.g., money, stock, personalty, realty, etc.) that is lent for the temporary use by a loan seeker, and is to be contrasted with a "line of credit" which is defined as an amount of credit extended to a loan seeker, all or a portion of which can ripen into a loan at the loan seeker's discretion.

In accordance with the illustrative embodiment of the present invention, one or more application processors (e.g., application processor 104) and one or more loan processors (e.g., loan processor 105) are advantageously engaged to facilitate the provision of loans and lines of credit between lenders and loan seekers.

For the purposes of this specification, an "application processor" is defined as an entity that prepares a loan solicitation. Although a sophisticated loan seeker can act as his or her own application processor, it might be desirable for a less sophisticated loan seeker to have another entity act as an application processor.

For the purposes of this specification, a "loan solicitation" is defined as an inquiry or an application for a loan or line of credit. The types and nature of the data contained in a loan solicitation are discussed below.

For the purposes of this specification, a "loan processor" is defined as an entity that evaluates the compliance of a loan solicitation against a lending criteria. Although lenders often act as their own loan processors, a lender might employ another entity to act as a loan processor.

For the purposes of this specification, a "loan pool trader" is defined as an entity that engages in the purchase or sale of loans or pools of loans. Furthermore, because many entities in the loan and credit industry are large and sophisticated, it is common for a single entity to perform different roles at different times or with respect to different transactions. Therefore, for the purposes of this specification, a single entity can be:

(i) a lender, or
(ii) a loan pool trader, or
(iii) an application processor, or
(iv) a loan processor, or
(v) a loan seeker, or
(vi) any combination of i, ii, iii, iv, and v.

The heart of the illustrative embodiment is data processing system 101, which receives data from each lender, loan seeker, application processor, loan processor, and loan pool trader, and endeavors to match lenders with appropriate loan seekers and to facilitate the provision of loans and lines of credit. Each lender, loan seeker, application processor, loan processor, and loan pool trader is advantageously capable of providing data to and receiving data from data processing system 101 via a data network (e.g., the Internet, etc.) or via a telephone network (e.g., the Public Switched Telephone Network, etc.) or both.

FIG. 2 depicts an illustrative embodiment of data processing system 101, which comprises: computer 201, local output device 202, data storage device 203, telephone center 204, telephone network interface 205, and data network interface 206. Computer 201 is advantageously a general-purpose computer as is well-known in the art that is capable of:

executing one or more programs that are stored in data storage device 203;

storing data in and retrieving data from data storage device 203;

outputting data to local output device 202;

receiving data from and outputting data to telephone center 204; and receiving data from and outputting data to data network interface 206.

Local output device 203 is a device (e.g., a printer, a tape drive, removable hard disk, etc.) from which data from data processing system 101 can be output for processing or delivery to lenders, loan seekers, application processors, loan processors, loan pool traders, and statistics subscribers.

Data storage device 203 is advantageously a non-volatile memory (e.g., a hard disk, a tape drive, an optical device, etc.) for storing the program code executed by computer 201 and the data input into and generated by the illustrative embodiment.

Data network interface 206 enables lenders, loan seekers, application processors, loan processors, loan pool traders, and statistics subscribers to communicate with data processing system 101 via a data network, such as the Internet. For example, data processing system 101 can be accessed via the World Wide Web.

Alternatively, lenders, loan seekers, application processors, loan processors, loan pool traders, and statistics subscribers can communicate with data processing system 101 via telephone, such as through a toll-free "800" number. To this end, telephone network interface 205 advantageously comprises one or more telephones that are capable of receiving calls from and placing calls to lenders, loan seekers, application processors, loan processors, loan pool traders, and statistics subscribers. Telephone network interface 205 can further comprise an automatic call distribution system, in well-known fashion, for routing incoming calls to the various telephones. Furthermore, telephone network interface 205 is advantageously capable of receiving information from lenders, loan seekers, application processors, loan processors, loan pool traders, and statistics subscribers via a touch-tone interface wherein the parties input information to the system by pushing the buttons on their telephones in response to questions from an automated operator.

Telephone center 204 advantageously comprises one or more computer terminals that are operated by the personnel associated with telephone network interface 205 such that an operator (either human or automated) can shuttle data between computer 201 and a lender, loan seeker, application processor, loan processor, loan pool trader, or statistics subscriber who is in contact with data processing system 101 via telephone network interface 205.

It will be clear to those skilled in the art how to make and use computer 201, local output device 202, data storage device 203, telephone center 204, telephone network interface 205, and data network interface 206. Although data processing system 101 is shown as depicting only one computer and one storage device, it will be clear to those skilled in the art that a data processing system in accordance with the present invention can also comprise one or more computers and one or more storage devices.

FIG. 3 depicts the relationship of FIGS. 4 and 5, and FIG. 4 depicts a first portion of a flowchart of the operation of data processing system 101 in accordance with the illustrative embodiment.

At step 301, a lending criteria is received at data processing system 101 from each of a plurality of lenders. Each lending criteria can be received at data processing system 101 via a data network and data network interface 206 or via a telephone network and telephone network interface 205.

For the purposes of this specification, a "lending criteria" is defined as an indicium of:

i. the types of loans and lines of credit that a lender is endeavoring to provide; or ii. one or more minimum standards that a loan seeker must satisfy before the loan seeker is matched to the lender by data processing system 101; or iii. the interest rate, fees, and terms for each type of loan or line of credit that the lender is endeavoring to provide; or iv. any combination of i, ii, and iii.

For example, Lender A can input into data processing system 101 a lending criteria that indicates that it is endeavoring to provide: (1) home mortgage loans, (2) auto loans, (3) personal loans, (4) small business loans, and (5) accounts receivable loans, and the standards, interest rates, fees and terms by which it endeavors to make such loans. Although a lending criteria can be quite complicated and is typically different for each lender, Table 4 provides an example of a lending criteria that one lender, Lender A, might input into data processing system 101 for 30-year fixed-rate home mortgage loans.

TABLE 4

Lending criteria for Lender A for Home Mortgage Loans

| Amount of Loan | Loan seeker's Income | Location of Home (by Postal ZIP Code) | Interest Rate |
| --- | --- | --- | --- |
| $25,000-$50,000 | >$28,000/year | 077xx, 078xx, 079xx | 7.15% |
| $50,001-$128,000 | >$46,500/year | 0770x, 078xx, 0792x | 7.15% |
| $50,001-$128,000 | >$66,000/year | 0770x, 078xx, 0792x | 7.05% |
| $128,001-$217,000 | >$75,000/year | 07701, 078xx, 0792x | 7.20% |
| $217,001-$310,000 | >$105,000/year | 0781x, 0792x | 7.35% |

In contrast, another lender, Lender B, might input into data processing system 101 a lending criteria that indicates that it is endeavoring to provide: (1) home mortgage loans, (2) auto loans and (3) student loans, wherein the loan criterion for 30-year fixed-rate home mortgage loans is summarized in Table 5.

TABLE 5

Lending criteria for Lender B for Home Mortgage Loans

| Amount of Loan | Loan seeker's Income | Tenure at Job | Interest Rate |
| --- | --- | --- | --- |
| $20,000-$40,000 | >$25,000/year | 12 months | 7.10% |
| $40,001-$108,000 | >$44,000/year | 18 months | 7.15% |
| $108,001-$165,000 | >$55,000/year | 18 months | 7.25% |
| $165,001-$200,000 | >$85,000/year | 24 months | 7.30% |
| $200,001-$250,000 | >$100,000/year | 24 months | 7.35% |

It should be noted that not only are the standards for home mortgage loans for Lender A different than the standards for Lender B, but that the character of the standards are also different. For example, although both Lender A and Lender B use the amount of the loan and the loan seeker's income as standards, only Lender A uses the geographic location of the home as a standard. In contrast, only Lender B uses the loan seeker's tenure at his or her job as a standard.

Therefore, it will be clear to those skilled in the art that the sample lending criteria depicted in Tables 1 and 2 are simplified for pedagogical purposes and that the lending criteria used by other lenders can be significantly more complicated. Furthermore, it will be clear to those skilled in the art how to create and input a loan criterion into data processing system 101 for one or more types of loans and lines of credit and for any set of standards, interest rates, fees and terms.

In accordance with the illustrative embodiment of the present invention, a lender can input a revised lending criteria into data processing system 101 at any time or withdraw all or a portion of a lending criteria at any time. This is to enable a lender to adjust his or her offering as its situation and market conditions change.

The lending criteria from each of the plurality of lenders are stored in loan criterion database 251 in data storage device 203.

At step 302, data processing system 101 compiles statistics on the lending criteria received from the plurality of lenders. Such statistics might include, but are not limited to:

the number of lenders who have lending criteria pending in data processing system 101;

the number of lenders who are endeavoring to provide loans or lines of credit for each type of loan;

any element of a lending criteria as a function of any other element of a lending criteria—to answer questions such as "What is the lowest interest rate cited in a loan criterion for a home mortgage loan for $86,000 in Manhattan to a loan seeker who earns $102,000 per year and who has been at their current job for two years?" and "What is the largest auto loan available to a loan seeker to earns $34,000 per year?"

the elements for any type of loan or line of credit—to answer questions such as "What are the elements considered by all lenders endeavoring to provide home mortgage loans?"

It will be clear to those skilled in the art how to compile such statistics from the lending criteria received. Advantageously, step 302 is performed each time a new loan criterion or a revised loan criterion is received by data processing system 101 or a loan criterion is withdrawn.

The statistics compiled at step 302 are stored in statistical database 253 in data storage device 203. Because the statistics stored in statistical database 253 are valuable, they can be sold or provided as described below with respect to step 312.

At step 303, a loan solicitation is received at data processing system 101 from each of one or more loan seekers. As with the loan criterion, each loan solicitation can be received at data processing system 101 via a data network and data network interface 206 or via a telephone network and telephone network interface 205. Furthermore, each loan solicitation can be a mere inquiry about the availability of a loan, its rates, fees, and terms, or it can be a contractual offer to enter into a loan or line of credit agreement.

Each loan solicitation can be received at data processing system 101 directly from a loan seeker or indirectly through an entity that acts as an application processor for the loan seeker. In either case, a record is kept in netbacking database 255 of whether an application processor is used, and if so, who the application processor is. The purpose of keeping a record of whether an application processor is used is to ensure that the application processor is compensated for his or her service, as discussed in detail below with respect to step 310.

Advantageously, each loan solicitation is received in the form of answers to a series of questions, which questions are based, at least in part, on the statistics compiled in step 302. In particular, the questions are designed to elicit answers that enable data processing system 101 to determine how well the loan seeker compares to the lending criteria from each lender. In other words, the questions are designed to provide data processing system 101 with that necessary data to enable it to match, if possible, each loan seeker to the most appropriate lender.

For example, if the two lenders, Lender A and Lender B discussed above, are the only two lenders who have input lending criteria into data processing system 101, then the two lenders, in aggregate, are endeavoring to provide the six types of loans and lines of credit shown in Table 6.

TABLE 6

Types of Loans and Lines of Credit Available accounts receivables loans
auto loans
home mortgage loans
personal loans
small business loans
student loans Therefore, the first piece of data sought in a loan solicitation might be designed to identify the type of loan or line of credit that the loan seeker is seeking. For example, the first question put to a loan seeker might be "What type of loan are you interested in—an accounts receivable loan, an auto loan, a home mortgage loan, a personal loan, a small business loan, or a student loan?" The subsequent data sought in the loan solicitation advantageously enables data processing system 101 to determine whether the loan seeker satisfies the lending criteria for the type of loan or line of credit sought, and if multiple lenders endeavor to provide loans and lines of credit of that type, who the appropriate lender is.

For example, if the loan solicitation indicates that the loan seeker is interested in a "30-year, fixed-rate home mortgage loan," then data processing system 101 must ascertain whether the loan seeker is qualified for such a loan from either Lender A or Lender B or both (because both Lender A and Lender B endeavor to provide such loans).

To this end, and given the lending criteria in Tables 4 and 5, above, the following questions might be put to the loan seeker:

1) How much money do you want to borrow?
2) What is your income?
3) How long have you been at your current job?
4) What is the Postal ZIP Code for the home you are purchasing?

Although question #3 is only relevant to the lending criteria for Lender B and question #4 is only relevant to the lending criteria for Lender A, both questions are advantageously asked and their answers received and stored in loan solicitation database 252.

To reiterate, the data sought in a loan solicitation is designed to enable data processing system 101 to match, if possible, each loan solicitation from a loan seeker to the most appropriate lender.

At step 304, data processing system 101 compiles statistics on the loan solicitations received. Such statistics might include, but are not limited to:

the number of loan solicitations for each type of loan or line of credit received in a given interval;
the total dollar volume of loan solicitations received for each type of loan; and
any element of any loan solicitation as a function of any other element—to answer questions such as "What is the total dollar volume of the loan solicitations received in the last 6 days from loan seekers seeking home mortgage loans for $200,000 or more in New Jersey?"

It will be clear to those skilled in the art how to compile such statistics. Advantageously, step 304 is performed each time a new loan solicitation is received by data processing system 101 or a loan solicitation is amended or withdrawn.

The statistics compiled at step 304 are stored in statistical database 253 in data storage device 203. Because the statistics stored in statistical database 253 are valuable, they can be sold or provided as described below with respect to step 312.

At step 305, data processing system 101 compares each loan solicitation received in step 303 to the lending criteria stored in lending criteria database 251 to identify, if possible,
(1) a selected lender, and
(2) a prioritized list of alternative lenders, including a first alternative lender.

In other words, data processing system 101 endeavors to find one or more lenders who, based on the lending criteria in lending criteria database 251 are satisfied by the loan solicitation received in step 303. There are three possible outcomes of step 305:

The loan solicitation does not satisfy the lending criteria of any lender;

The loan solicitation satisfies the lending criteria of only one lender; or

The loan solicitation satisfies the lending criteria of two or more lenders.

Depending on the outcome of step 305, data processing system 101 then, at step 306, advantageously outputs:

i. (to the selected lender) an indicium of the identity of the loan seeker; or ii. (to the selected lender) the loan solicitation to the selected lender; or iii. (to the loan seeker) an indicium of the identity of the selected lender; or iv. (to the loan seeker) an indicia of the interest rate, fees, and terms cited in the lending criteria satisfied by the loan criteria from the selected lender; or v. (to the loan seeker) an indicium of the identity of the alternative lenders; or vi. (to the loan seeker) an indicia of the interest rate, fees, and terms cited in the lending criteria satisfied by the loan criteria from each of the alternative lenders; or vii. any combination of i, ii, iii, iv, v, and vi.

Case #1—In the first case, when the loan solicitation does not satisfy the lending criteria of any lender, data processing system 101 informs the loan seeker of such (or the application processor if one is used). As an example of the first case, assume that a loan seeker, Loan Seeker #1, provides the loan solicitation depicted in Table 7.

TABLE 7

| Loan Solicitation from Loan Seeker #1 | |
| --- | --- |
| Type of Loan or Line of Credit Sought | Home Mortgage Loan |
| Amount of Loan | $211,000 |
| Income | $19,500 |
| Tenure at Job | 2 months |
| Postal ZIP Code for Home | 07920 |

By comparing the data in Table 7 to the lending criteria in Tables 4 and 5, it can be readily observed that Loan Seeker #1 does not satisfy the lending criteria of either Lender A or Lender B. Therefore, data processing system 101 informs the loan seeker of such and advantageously also informs the loan seeker why his or her loan solicitation did not satisfy any lender's lending criteria.

Case #2—In the second case, when the loan solicitation satisfies the lending criteria of only one lender, that lender is designated as the "selected lender" by data processing system 101. The selected lender and the loan seeker then interact, either through data processing system 101 or not, as necessary or desirable, to close the loan or line of credit. If the selected lender desires to engage the services of a loan processor (e.g., loan processor 105) to facilitate the closing, that fact, and the identity of the loan processor is conveyed to data processing system 101 and stored in netbacking database 255. The purpose of keeping a record of whether a loan processor is used is to ensure that the loan processor is compensated for his or her service. This is discussed in detail below with respect to step 310.

As an example of the second case, assume that a loan seeker, Loan Seeker #2, provides the loan solicitation depicted in Table 8.

TABLE 8

| Loan Solicitation from Loan Seeker #2 | |
| --- | --- |
| Type of Loan or Line of Credit Sought | Home Mortgage Loan |
| Amount of Loan | $211,000 |
| Income | $95,000/year |
| Tenure at Job | 60 months |
| Postal ZIP Code for Home | 07920 |

By comparing the data in Table 8 to the lending criteria in Tables 4 and 5, it can be seen that Loan Seeker #2 satisfies the lending criteria of Lender A for a loan of $211,000 (which is quoted at 7.25%). Furthermore, it can be seen that Loan Seeker #2 does not satisfy the lending criteria of Lender B for a loan of $211,000 because Loan Seeker #2 has insufficient income ($95,000 is below the $100,000 per year required). Therefore, the loan solicitation only satisfies the lending criteria from Lender A and, therefore, data processing system 101 identifies Lender A as the selected lender.

Whether the selected lender and loan solicitor communicate solely through data processing system 101 to close the loan or line of credit, data processing system 101 advantageously tracks the progress of each application, all lender and loan seeker communications, document processing steps, closing rates as a percentage of loan solicitations referred and the resulting billings and receipts of the parties. This is useful for, among other things, ensuring that parties do not receive the benefit of data processing system 101 without paying for it.

Furthermore, data processing system 101 maintains a permanent record of the closing criteria for each loan and line of credit in closing criteria database 257. For the purposes of this specification, the term "closing criteria" is defined as those attributes of the loan solicitation and lending criteria for the loan or line of credit that might be useful at a later time to cost/value that loan or line of credit. The purpose of maintaining the closing criteria for each loan and line of credit is discussed below with respect steps 313 to 315.

Case #3—In the third case, when the loan solicitation satisfies the lending criteria of two or more lenders, data processing system 101 identifies one of those lenders whose lending criteria are satisfied as the selected lender and the remaining lenders as alternative lenders. Of the lenders whose lending criteria are satisfied, that lender that cites the lowest interest rate and fees and the best terms for the loan or line of credit is identified as the selected lender.

If there are more than two lenders whose lending criteria are satisfied by the loan solicitation and that offer the same interest rate, fees, and terms for a given loan or line of credit, data processing system 101 selects the chronologically first to offer the interest rate, fees, and terms as the selected lender. This convention further induces lenders to lower their interest rates and fees quickly and to improve their terms, which contributes to the efficiency of the market.

If there are two or more lenders whose lending criteria are satisfied by the loan solicitation but that offer a different, but clearly good, combination of interest rates, fees, and terms for a given loan or line of credit, data processing system 101 can select them both as co-selected lenders. In this case, the loan seeker might be given the option of which he or she desires to deal with.

The first alternative lender is that lender of all of the lenders whose lending criteria are satisfied by the loan solicitation that offers less advantageous interest rates and fees or terms for the loan or line of credit. The second and subsequent alternative lenders are identified similarly.

The utility of identifying alternative lenders arises when, for any reason, the selected lender is unable or unwilling to provide the loan or line of credit despite the loan criterion to the contrary. If the selected lender fails to provide a loan or line of credit, then the selected lender can be punished by a fine to either the owner of data processing system 101 or to the loan seeker or both. In the event that a selected lender does not provide the loan or line or credit, it is stricken as the selected lender and the first alternative lender becomes identified as the selected lender. The newly identified selected lender and the loan seeker then endeavor to close the loan or line of credit.

As an example of the third case, assume that a loan seeker, Loan Seeker #3, provides the loan solicitation depicted in Table 9.

TABLE 9

| Loan Solicitation from Loan Seeker #2 | |
|---|---|
| Type of Loan or Line of Credit Sought | Home Mortgage Loan |
| Amount of Loan | $135,000 |
| Income | $80,000/year |
| Tenure at Job | 30 months |
| Postal ZIP Code for Home | 07701 |

By comparing the data in Table 9 to the lending criteria in Tables 4 and 5, it can be seen that Loan Seeker #3 satisfies the lending criteria for both Lender A and Lender B. For such a loan, Lender A quotes a 7.20% interest rate and Lender B quotes 7.25%. Therefore, because the interest rate cited by Lender A is lower than that of Lender B, data processing system 101 identifies Lender A as the selected lender and Lender B as the first alternative lender (assuming that the other fees and terms are comparable).

At step 307, data processing system 101 compiles statistics on the matching of loan solicitations to lending criteria, and of the failure to match loan solicitations to lending criteria. Such statistics might include, but are not limited to:

the number of matches for each type of loan in a given interval;

the total dollar volume of the matches for each type of loan; and any aspect of any match as a function of any other aspect—to answer questions such as "What is the average interest rate of the matches made in the last hour from auto loans in California?"

It will be clear to those skilled in the art how to compile such statistics. Advantageously, step 307 is performed each time a match is made between a loan solicitation and a loan criterion and each time there is a failure to match a loan solicitation to a loan criterion.

The statistics compiled at step 307 are stored in statistical database 253 in data storage device 203. Because the statistics stored in statistical database 253 are valuable, they can be sold or provided as described below with respect to step 312.

At step 308, data processing system 101 receives an indication of the fee incurred by each patron (e.g., the selected lender, the loan seeker, etc.) associated with the transaction, which fee is correspondingly earning by the owner/operator of data processing system 101. Advantageously, the fee is incurred by the selected lender when the loan or credit line is closed and no fee is incurred by the loan seeker. In an alternative embodiment of the present invention, the fee is incurred by the selected lender for merely introducing the selected lender and the loan seeker in step 306. In another alternative embodiment, the fee is incurred by the loan seeker. In yet another alternative embodiment, a fee is incurred by the selected lender and a fee is incurred by the loan seeker.

Advantageously, the fee is based on the dollar volume of the loan or line of credit, and the indication of the fee incurred is stored in earned fee database 254 in data storage device 203. The fee information is valuable because it enables data processing system 101 to determine how to distribute, remit and credit the aggregate fees and to price the statistics in statistics database 253. More is said about this in steps 309 through 312.

At step 309, data processing system 101 compiles statistics on the fees incurred, if any, from each loan seeker and lender. Such statistics might include, but are not limited to:

the aggregate fees incurred by a given lender in a given interval;

the aggregate fees incurred by all lenders in a given interval in which a given application processor has prepared the loan solicitation;

the aggregate fees incurred by all lenders in a given interval in which a given loan processor has facilitated the closing of a loan or line of credit; and the aggregate fees incurred by a given lender in a given interval in which the lender has acted as his or her own loan processor;

the aggregate fees incurred as a function of any aspect of any lending criteria or loan solicitation—to answer questions such as "What are the aggregate fees incurred on loan solicitations for home mortgage loans for $200,000 or more in New Jersey in the last 28 days?"

It will be clear to those skilled in the art how to compile such statistics. Advantageously, step 309 is performed each time an indication of an incurred fee is received by data processing system 101 (step 308).

The statistics compiled at step 309 are stored in statistical database 253 in data storage device 203. Because the statistics stored in statistical database 253 are valuable, they can be sold or provided as described below with respect to step 312.

At step 310, data processing system 101 computes and outputs an indicium of the portion of the fee incurred in step 308 by:

(1) the loan seeker;
(2) the application processor, if one was used; and
(3) the loan processor, if one was used.

In all cases, the remittance of some portion of the incurred fee to each of these parties is made not only to compensate the party for the services they have performed, but also to encourage and reward the parties for facilitating the closing of loans and lines of credit through data processing system 101.

With regard to the loan seeker, a portion of the fee incurred by the lender might be provided to the loan seeker based on the total dollar volume of loans or lines of credit that the loan seeker has received through data processing system 101 in a given interval. In other words, the loan seeker should be rewarded for his or her patronage of data processing system 101. The statistics compiled in step 309 are useful in determining the amount of the fee incurred by the loan seeker.

Furthermore, if the loan seeker acts as his or her own application processor, then the loan seeker lowers the cost of doing business for the lender and should be rewarded for doing so. Therefore, the remittance of a portion of the incurred fee to the loan seeker encourages the loan seeker to act as his or her own application processor.

With regard to an application processor who acts as an agent for the loan seeker (if one is engaged with regard to a particular loan or line of credit), a portion of the incurred fee is remitted back to the application processor for his or her service in assisting the loan seeker in preparing the loan solicitation. Furthermore, because the application processor and not the loan seeker might make the decision to patronize data processing system 101, the application processor is advantageously also provided an additional portion of the incurred fee as an origination fee for choosing data processing system 101. The origination fee might vary, for example, on the total dollar volume of the loans and lines of credit closed in which the application processor is involved. The statistics compiled in step 309 are useful in determining the amount of the fee incurred by the application processor.

With regard to the loan processor (if one is engaged with regard to a particular loan or line of credit), a portion of the incurred fee is remitted back to the loan processor for his or her service in facilitating the closing of the loan or line of credit. Furthermore, to encourage the loan processor to expedite the closing of the loan or line of credit involving data processing system 101, an additional portion of the incurred fee is advantageously provided to the loan processor based on the total dollar volume of the loans and lines of credit closed in which the loan processor is involved. The statistics compiled in step 309 are useful in determining the amount of the fee to be remitted to the loan processor.

As shown in FIG. 5, at step 311, data processing system 101 outputs an indicium of a portion of the fee, if any, to be remitted back to the selected lender. The purpose of remitting a portion of the fee back to the selected lender is to encourage the selected lender to:
  (i) patronize data processing system 101;
  (ii) offer the widest variety of loans and lines of credit at the lowest interest rates and fees and with the best terms; and
  (iii) close the largest number of loans and lines of credit possible through the system.

To this end, the amount of the fee to be remitted back is advantageously dependent on: (i) the measure of fees incurred by data processing system 101 from transactions in a given interval in which the lender has provided the loans and lines of credit, and (ii) a graduated schedule (e.g., Table 1 above, etc.). For example, if less than $1,000,000 in fees are incurred by a given lender within the last month, then only 15% of the incurred fee is remitted back to the lender. In contrast, if more than $5,000,000 in fees are incurred by a given lender within the last month, then 35% of the incurred fee is remitted. The statistics compiled in step 309 are useful in determining the amount of the fee to be remitted back to the selected lender.

Furthermore, at step 311, data processing system 101 outputs:
  i. an indicium of a portion of the fees incurred with respect to the primary market and with respect to each lender to be credited to each lender, which credit can be applied against the fees incurred by the lender in the secondary market;
  ii. an indicium of a portion of the fees incurred with respect to the secondary market and with respect to each lender to be credited to each lender, which credit can be applied against the fees incurred by the lender in the primary market; and
  iii. an indicium of the price to be paid by each lender and statistics subscriber for the statistics output in step 312 and an indicium of the terms and nature of the statistics output in step 312.

The purpose of crediting a portion of the fee in one market to the other is to further encourage the lender to:
  (i) patronize data processing system 101;
  (ii) offer the widest variety of products at the lowest interest rates and fees and with the best terms;
  (iii) close the largest number of loans and lines of credit possible with the assistance of data processing system 101; and
  (iv) trade loans and pools of loans through data processing system 101.

Furthermore, by changing the amount of the fees in one market that can be credited against the fees in the other, the illustrative embodiment is able to affect the efficiency of both the primary and the secondary markets.

The amount of the fee to be remitted back is also advantageously dependent on: (i) the measure of fees incurred by data processing system 101 from transactions in a given interval in which the lender has provided the loans and lines of credit, and (ii) a graduated schedule (e.g, Table 3 above, etc.). It will be clear to those skilled in the art how to compute and output an indicium of the fee to be remitted back to each lender and how to compute and output an indicium of the fee to be credited to each lender against fees incurred for trading loans and pools of loans through data processing system 101.

At step 312, data processing system 101 outputs some or all of the statistics (regarding the primary market or the secondary market) stored in statistics database 253. It will be clear to those skilled in the art that the "statistics" provided can include raw data as well as information about the raw data. Advantageously, some parties are given the statistics in real-time, while others are given them delayed by some duration (e.g., 15 minutes, 24 hours, etc.). Typically, the statistics in real-time will be considered more valuable than the statistics that are delayed. Furthermore, some parties might be given more statistics than others.

Although some or all of the statistics can be sold for cash to the statistics subscribers (e.g., a newspaper, a financial analyst, etc.), the statistics are advantageously given for free or at a subsidized price to those patrons (e.g., the lenders, loan seekers, loan pool traders, etc.) who actually close loans and lines of credit or buy or sell loans through data processing system 101. In particular, the price of the statistics for a given patron advantageously decreases as a measure of the fees incurred with respect to all transactions (in both the primary and secondary markets) associated with that patron increase. The decision whether to output statistics to a patron in real-time or not and for free or for a subsidized price is advantageously made based on the amount of fees incurred by transactions involving that patron in a given interval, which is considered one indication of how much that patron has contributed to the efficiency of the market on data processing system 101. The data stored in earned fee database 254 and netbacking database 255 are useful for this purpose.

In steps 313 through 319, data processing system 101 functions as a market for the trading of loans between loan pool traders, for which each loan pool trader incurs a fee, which is paid to the owner/operator of data processing system 101. In general, it will be to the advantage of the loan pool traders if they base their bids and offers to trade at least partially on the statistics output to them in step 312. Otherwise, they are likely to be arbitraged by other entities that do.

For the purposes of this specification, a "pool of loans" is defined as comprising one or more loans. Advantageously, the offers to sell and the bids to purchase are based on the statistics output to the loan pool traders in step 312. Furthermore, the fees incurred by a loan pool trader for trading loans through data processing system 101 are advantageously considered by data processing system 101 in determining the price, timeliness, and completeness of the statistics offered to the loan pool trader in step 312.

At step 313, data processing system 101 receives an offer to sell one or more loans at an offering price from a loan pool trader. Advantageously, each offer either:
  1) describes each loan in terms of its closing criteria, or
  2) identifies each loan so that a potential bidder can retrieve the loan's closing criteria from closing criteria database 257.

In either case, this facilitates the sale of pools of heterogeneous loans by enabling each potential purchaser to evaluate the value of each loan in the pool by his or her own standards. Furthermore, the offering price quoted for each pool of loans is advantageously based on the statistics received by the loan pool trader in step 312.

At step 314, data processing system 101 compiles statistics on the pool of loans offered for sale in step 313. The statistics might include, but are not limited to:

What is the total dollar volume of all of the pools of loans offered for sale?

Any function of the offer to sell as a function of any other function—to answer questions such as "What is the lowest price offered for a pool of 100 home mortgage loans in New Jersey to borrowers who earn more than $65,000 per year?"

It will be clear to those skilled in the art how to compile such statistics, which are stored in statistics database 253. Advantageously, the statistics are re-compiled each time a new offer is received to sell a pool of loans.

The statistics compiled at step 314 are stored in statistical database 253 in data storage device 203. Because the statistics stored in statistical database 253 are valuable, they can be sold or provided as described with respect to step 312.

At step 315, data processing system 101 receives an offer to buy one or more loans at a bid price from each of a plurality of loan pool traders. Advantageously, the bid to buy specifies the minimum closing criteria for each loan and the bid price is based by the loan pool trader on the statistics received by the loan pool trader in step 312.

At step 316, data processing system 101 compiles statistics on the offers to buy received in step 315. The statistics might include, but are not limited to:

Any function of the offer to buy as a function of any other function—to answer questions such as "What is the highest price offered for a pool of 100 home mortgage loans in New Jersey to borrowers who earn more than $65,000 per year?"

It will be clear to those skilled in the art how to compile such statistics, which are stored in statistics database 253. Advantageously, the statistics are re-compiled each time a new offer is received to buy a pool of loans.

The statistics compiled at step 316 are stored in statistical database 253 in data storage device 203. Because the statistics stored in statistical database 253 are valuable, they can be sold or provided as described with respect to step 312.

At step 317, data processing system 101 compares each offer to sell a pool of loans to each offer to buy a pool of loans to identify, if possible, a match between a seller and a buyer.

At step 318, if a match between a seller and a buyer is found for a pool of loans, that fact is output from data processing system 101 to both the buyer and the seller so that the sale can be consummated.

At step 319, data processing system 101 compiles statistics on sale of the pool of loans in step 318. The statistics might include, but are not limited to:

What is the total dollar volume of all of the loans sold in the last 24 hours?

Any function of the sale to buy as a function of any other function—to answer questions such as "What is last price given for a pool of 100 home mortgage loans in New Jersey to borrowers who earn more than $65,000 per year?"

It will be clear to those skilled in the art how to compile such statistics, which are stored in statistics database 253. Advantageously, the statistics are re-compiled each time a new sale is consummated.

The statistics compiled at step 316 are stored in statistical database 253 in data storage device 203. Because the statistics stored in statistical database 253 are valuable, they can be sold or provided as described with respect to step 312.

At step 320, data processing system 101 receives an indication of the fee incurred for brokering the sale of a pool of loans. Advantageously, the fee is incurred by both the buying and the selling loan pool trader. In an alternative embodiment, the fee is incurred only from the selling loan pool trader. In an alternative embodiment, the fee is incurred by only the buying loan pool trader.

Advantageously, the fee is based on the dollar volume of the sale, and the indication of the fee incurred is stored in earned fee database 254 in data storage device 203. The fee information is valuable because it enables data processing system 101 to determine how to distribute the aggregate fees and the statistics in statistics database 253 among the various lenders, loan seekers, application processors, loan processors, and the owner of data processing system 101.

After step 320, control figuratively passes to step 301, although it will be clear to those skilled in the art that the steps in FIGS. 4 and 5 need not be performed in order. Rather, many of the steps are advantageously performed in parallel in response to the submissions of lending criteria, loan solicitations, offers to sell and offers to buy individual loans and pools of loans.

It is to be understood that the above-described embodiments are merely illustrative of the invention and that many variations can be devised by those skilled in the art without departing from the scope of the invention. It is therefore intended that such variations be included within the scope of the following claims and their equivalents.

In the following claims, the term "loans" is used, but the term "loans" as used in the claims is intended to encompass any and all debt agreements, including specifically, loans, lines of credit, debt instruments including bonds and debentures, and derivatives thereof.

What is claimed is:

1. Apparatus for providing a market for loans, comprising:
    a data processing system having a program executing computer, a data storage device, and an output device;
    a plurality of loan underwriting standards data records stored in said data storage device containing loan underwriting standards from a plurality of loan granting institutions;
    computer programs executing on said data processing system for:
        compiling statistics regarding said plurality of stored data records containing loan underwriting standards and storing statistics data records in said data storage device;
        receiving loan solicitation data records in said data storage device;
        comparing said loan solicitation data records to said loan underwriting standards data records from said plurality of loan granting institutions to identify one or more loan granting institutions and to provide data records identifying said loan seeker to said loan granting institution;
        providing from said data processing system said statistics to a data processing system participant; and
        calculating a price to the data processing system participant for said statistics data records provided to the data processing system participant, in which the price is reduced for fees obtained from transactions associated with the data processing system participant in accordance with a predetermined netbacking schedule stored in a netbacking database, and based on the data processing system participant providing one or more loan underwriting standards data records.

2. The apparatus of claim 1 further comprising:
  computer programs executing on said data processing system for providing from said data processing system said statistics data records to a selected loan granting institution; and calculating a price to the selected loan granting institution for providing said statistics data records in which the price is reduced for fees obtained from transactions associated with the selected loan granting institution.

3. The apparatus of claim 1, further comprising computer programs executing on said data processing system for:
  receiving loan pool data records from one or more loan granting institutions;
  receiving loan pool purchase offer data records from one or more data processing system participants;
  comparing said loan pool purchase offer data records with said loan pool data records to identify one or more data processing system participants.

4. The apparatus of claim 3 further comprising:
  an indicium output by an output device providing an identification of said one or more data processing system participants.

5. The apparatus of claim 3 further comprising:
  computer programs executing on said data processing system for calculating a fee due from a loan granting institution or a data processing system participant for brokering the sale of said loan pool to an identified data processing system participant.

6. The apparatus of claim 5, further comprising:
  computer programs executing on said data processing system for compiling loan purchase statistics regarding loan pool purchase offer data records; and storing loan purchase statistics data records in said data storage device.

7. The apparatus of claim 3, further comprising computer programs executing on said data processing system for calculating a price to a data processing system participant for receiving loan pool data records and loan pool purchase offer data records.

8. The apparatus of claim 5, further comprising computer programs executing on said data processing system for calculating a price to a data processing system participant for receiving loan purchase statistics data records.

9. The apparatus of claim 8, wherein said data processing system participant is a loan granting institution, and further comprising computer programs executing on said data processing system for calculating a reduced price to the loan granting institution for receiving in accordance with a predetermined netbacking schedule stored in a netbacking database based on the loan granting institution providing one or more loan pool data records.

10. The apparatus of claim 5, further comprising computer programs executing on said data processing system for providing from said data processing system said loan purchase statistics data records to a selected data processing system participant; and calculating a price for providing said loan purchase statistics data records to said selected data processing system participant that is based on a fee earned with respect to said selected data processing system participant.

11. The apparatus of claim 3, further comprising computer programs executing on said data processing system for providing from said data processing system said loan pool data records to a selected data processing system participant; and calculating a price for providing said loan pool data records to said selected data processing system participant that is based on said fees earned with respect to said selected data processing system participant.

12. The apparatus of claim 3, further comprising computer programs executing on said data processing system for providing from said data processing system said loan pool purchase offer data records to a selected data processing system participant; and calculating a price for providing said loan pool purchase offer data records to said selected data processing system participant that is based on said fees earned with respect to said selected data processing system participant.

13. An apparatus, comprising:
  a data processing system having a program executing computer, a data storage device, and an output device;
  a plurality of loan underwriting standards data records stored in said data storage device containing loan underwriting standards from a plurality of loan granting institutions;
  computer programs executing on said data processing system for:
    compiling statistics regarding said plurality of stored data records containing loan underwriting standards and storing statistics data records in said data storage device;
    providing from said data processing system said statistics to a data processing system participant;
    calculating a price to the data processing system participant for said statistics data records provided to the data processing system participant, in which the price is reduced for fees obtained from transactions associated with the data processing system participant in accordance with a predetermined netbacking schedule stored in a netbacking database.

14. The apparatus of claim 13, further comprising computer programs executing on said data processing system for calculating a price to the data processing system participant for said statistics data records in which the price is reduced based on the data processing system participant providing one or more loan underwriting standards data records.

15. The apparatus of claim 14 further comprising:
  computer programs executing on said data processing system for providing from said data processing system said statistics data records to a selected loan granting institution; and calculating a price to the selected loan granting institution for providing said statistics data records in which the price is reduced for fees obtained from transactions associated with the selected loan granting institution.

16. The apparatus of claim 13, further comprising computer programs executing on said data processing system for:
  receiving loan pool data records from one or more loan granting institutions;
  receiving loan pool purchase offer data records from one or more data processing system participants.

17. The apparatus of claim 16, further comprising:
  computer programs executing on said data processing system for compiling loan purchase statistics regarding loan pool purchase offer data records; and storing loan purchase statistics data records in said data storage device.

18. The apparatus of claim 16, further comprising computer programs executing on said data processing system for calculating a price to a data processing system participant for receiving one or more of loan pool data records and loan pool purchase offer data records.

19. The apparatus of claim 17, further comprising computer programs executing on said data processing system for calculating a price to a data processing system participant for receiving loan purchase statistics data records.

20. The apparatus of claim 18, wherein said data processing system participant is a loan granting institution, and further comprising computer programs executing on said data processing system for calculating a reduced price to the loan granting institution for receiving one or more of loan pool data records and loan pool purchase offer data records in accordance with a predetermined netbacking schedule stored in a netbacking database.

21. The apparatus of claim 19, wherein said data processing system participant is a loan granting institution, and further comprising computer programs executing on said data processing system for calculating a reduced price to the loan granting institution for receiving loan purchase statistics data records in accordance with a predetermined netbacking schedule stored in a netbacking database.

22. The apparatus of claim 21, further comprising computer programs executing on said data processing system for providing from said data processing system said loan purchase statistics data records to a selected data processing system participant; and calculating a price for providing said loan purchase statistics data records to said selected data processing system participant that is based on a fee earned with respect to said selected data processing system participant.

23. The apparatus of claim 20, further comprising computer programs executing on said data processing system for providing from said data processing system said one or more of loan pool data records and loan pool purchase offer data records to a selected data processing system participant; and calculating a price for providing said one or more of loan pool data records and loan pool purchase offer data records to said selected data processing system participant that is based on said fees earned with respect to said selected data processing system participant.

24. A method comprising the steps of:
 receiving a plurality of loan underwriting standards data records from a plurality of loan granting institutions at a data processing system having a program executing computer, a data storage device, and an output device and storing the loan underwriting standards data records in said data storage device;
 executing a computer program on said data processing system for:
 (a) compiling a first set of statistics data records in said data processing system based on said plurality of underwriting standards data records from said plurality of loan granting institutions and storing the first set of statistics data records;
 (b) calculating a fee earned with respect to a selected loan granting institution;
 (c) providing from said data processing system said first set of statistics data records to the selected loan granting institution;
 (d) calculating a price for providing said first set of statistics data records to said selected loan granting institution that is based on said fee earned with respect to said selected loan granting institution in accordance with a predetermined netbacking schedule stored in a netbacking database.

25. The method of claim 24 wherein said price decreases as said fee increases.

26. The method of claim 24 further comprising of the step of:
 executing a computer program on said data processing system for providing from said data processing system a data record that a portion of said fee is to be remitted to said selected loan granting institution.

27. A method, comprising the steps of:
 receiving a plurality of underwriting standards data records from a plurality of loan granting institutions at a data processing system having a program executing computer, a data storage device, and an output device and storing the underwriting standards data records in said data storage device;
 executing computer programs on said data processing system for:
 compiling statistics data records in said data processing system based on said plurality of underwriting standards and storing the statistics data records;
 receiving at said data processing system an loan solicitation data record from an loan seeker;
 comparing in said data processing system said loan solicitation data record to said underwriting standards data records to identify a selected loan granting institution;
 receiving at said data processing system an indicium that a fee has been earned with respect to transactions involving said selected loan granting institution;
 calculating fees earned with respect to said selected loan granting institution;
 calculating a price for outputting a first set of statistics data records to said selected loan granting institution that is based on said fees earned with respect to transactions involving said selected loan granting institution within a given interval in accordance with a predetermined netbacking schedule stored in a netbacking database;
 providing from said data processing system said first set of statistics data records to said selected loan granting institution;
 providing from said data processing system said statistics data records to a data processing system participant; and
 receiving at said data processing system from said data processing system participant an offer to purchase loans.

28. Apparatus for providing a market for loan and debt purchase, comprising:
 a data processing system having a program executing computer, a data storage device, and an output device;
 a plurality of loan underwriting standards data records stored in said data storage device containing loan underwriting standards from a one or more loan granting institutions;
 computer programs executing on said data processing system for:
 (a) compiling statistics regarding said plurality of stored data records containing loan underwriting standards;
 (b) calculating fees earned with respect to the one or more loan granting institutions;
 (c) calculating a reduced price to the one or more loan granting institutions for providing said statistics regarding said stored data records to the selected loan granting institution based on the calculated fees earned with respect to said selected loan granting institution in accordance with a predetermined netbacking schedule stored in a netbacking database.

29. The apparatus of claim 28, further comprising:
 a plurality of loan purchase offer data records stored in said data storage device containing loan purchase offers from one or more data processing system participants;
 computer programs executing on said data processing system for:

(a) compiling statistics regarding said stored plurality of debt purchase offer data records containing debt purchase offers;

(b) calculating fees earned with respect to the one or more loan granting institutions and data processing system participants;

(c) calculating a reduced price to the one or more loan granting institutions and data processing system participants for providing said statistics regarding said statistics regarding said stored data records or said stored debt purchase offer data records to the one or more loan granting institutions and data processing system participants based on the calculated fees earned with respect to the one or more loan granting institutions and data processing system participants in accordance with a predetermined netbacking schedule stored in a netbacking database.

30. Apparatus for providing a market for loan and debt purchase, comprising:

a data processing system having a program executing computer, a data storage device, and an output device;

a plurality of loan and debt purchase offer data records stored in said data storage device containing loan and debt purchase offers from one or more data processing system participants;

computer programs executing on said data processing system for:

(a) compiling statistics regarding said plurality of stored debt purchase offer data records containing debt purchase offers;

(b) calculating a fees earned with respect to the one or more data processing system participants;

(c) calculating a reduced price to the one or more data processing system participants for output of said statistics regarding said stored debt purchase offer data records to the one or more data processing system participants based on the calculated fees earned with respect to the one or more data processing system participants in accordance with a predetermined netbacking schedule stored in a netbacking database.

31. A data processing method operable in connection with a loan market and an associated debt purchase market, comprising:

receiving a plurality of underwriting standards data records from a plurality of loan granting institutions at a data processing system having a program executing computer, a data storage device, and an output device, and storing the underwriting standards data records in said data storage device;

receiving an loan solicitation data record from an loan seeker at the data processing system and storing the loan solicitation data record in said data storage device;

executing computer programs on said data processing system for:

(a) comparing in said data processing system said loan solicitation data record to said underwriting standards data records to identify one or more selected loan granting institutions;

(b) receiving issued loan data records from selected loan granting institutions; and (c) compiling first statistics data records regarding said plurality of loan data records;

(d) storing the first statistics data records in said data storage device;

(e) receiving loan purchase offer data records from one or more data processing system participants and storing the loan purchase offer data records in said data storage device;

(f) receiving a plurality of loan pool data records from one or more loan granting institutions and storing the loan pool data records in said data storage device;

(g) comparing said loan purchase offer data records with said plurality of loan pool data records to identify one or more data processing system participants;

(h) compiling second statistics data records regarding said plurality of stored loan purchase offer data records;

(i) calculating a fee earned with respect to a data requester;

(j) calculating a reduced price to the data requester for providing one or more of the first and second statistics data records based on the fee earned with respect to the data requester in accordance with a predetermined netbacking schedule stored in a netbacking database.

32. A method for performance by a provider of computer information services, comprising the steps of:

during an application process for financial products offered by a plurality of offerors, obtaining information describing solicitations made by a plurality of applicants for the financial products and submitted for matching against underwriting standards of the offerors, and storing the solicitation information in a database;

essentially contemporaneously with the closing of each of a plurality of the financial products, updating the database with information describing the closed financial products; and making the database available to parties on a secondary market for the financial products.

33. The method of claim 32, further comprising the step of:

in a market for the financial products in which transactions occur among market participants in distinct first and second sectors, providing intermediation services for transactions in each of the two sectors;

a predetermined pricing schedule for the intermediation services providing credits for transaction fees paid by a party for intermediation of transactions in the first sector for redemption against fees payable by the party for intermediation of transactions in the second sector.

34. The method of claim 32, further comprising the step of:

providing intermediation services for buying and selling the financial products in the secondary market for the financial products; and structuring a pricing schedule to provide credits for transaction fees paid by a lender for obtaining the solicitation information for redemption against fees payable by the lender for intermediation of transactions in the secondary market.

35. The method of claim 32, further comprising the steps of:

offering access to the information to parties on the secondary market under a prearranged pricing schedule providing reductions in the price of the information as fees increase for provision of origination services for the financial products.

36. A computer, comprising:

hardware and/or software designed to obtain information describing solicitations for financial products from a plurality of applicants for origination of the financial products, and to store the solicitation information in a database;

hardware and/or software designed to match the solicitation information against underwriting standards of a plurality of offerors of the financial products;

hardware and/or software designed to receive information describing closed financial products, and to update the database with information describing the closed financial products essentially contemporaneously with the closing of the closed financial products; and an interface designed to make the database available to parties on a secondary market for the financial products.

37. The computer of claim 36, further comprising:

hardware and/or software designed to host a secondary market for buying and selling of the financial products and to maintain a record of fees earned for intermediation of transactions on the secondary market, a predetermined pricing schedule for intermediation services providing that transaction fees paid by a party for intermediation of transactions are to be credited against fees payable by the party for intermediation of other transactions, and providing for reduced pricing for access by a party to research information describing the loans, the price reduction based on increased transaction volume achieved by the party over an agreed time period.

38. The computer of claim 36, further comprising:

hardware and/or software designed to provide reductions in price for access to the database by a party, the reductions increasing based on increased transaction volume achieved by the party over an agreed time period according to a predetermined pricing schedule.

39. The computer of claim 36, further comprising:

hardware and/or software designed to provide intermediation data processing functions for buying and selling of the financial products on a secondary market, a predetermined pricing schedule for intermediation services providing that transaction fees paid by a party for intermediation of transactions are to be credited against fees payable by the party for intermediation of other transactions, and providing for reduced pricing for access by a party to research information describing the financial products, the price reduction based on increased transaction volume achieved by the party over an agreed time period.

* * * * *